July 30, 1963   W. E. BARKER, JR   3,099,158
APPARATUS FOR MEASURING LEVELS OF MATERIALS IN CONTAINERS
Filed Jan. 2, 1962
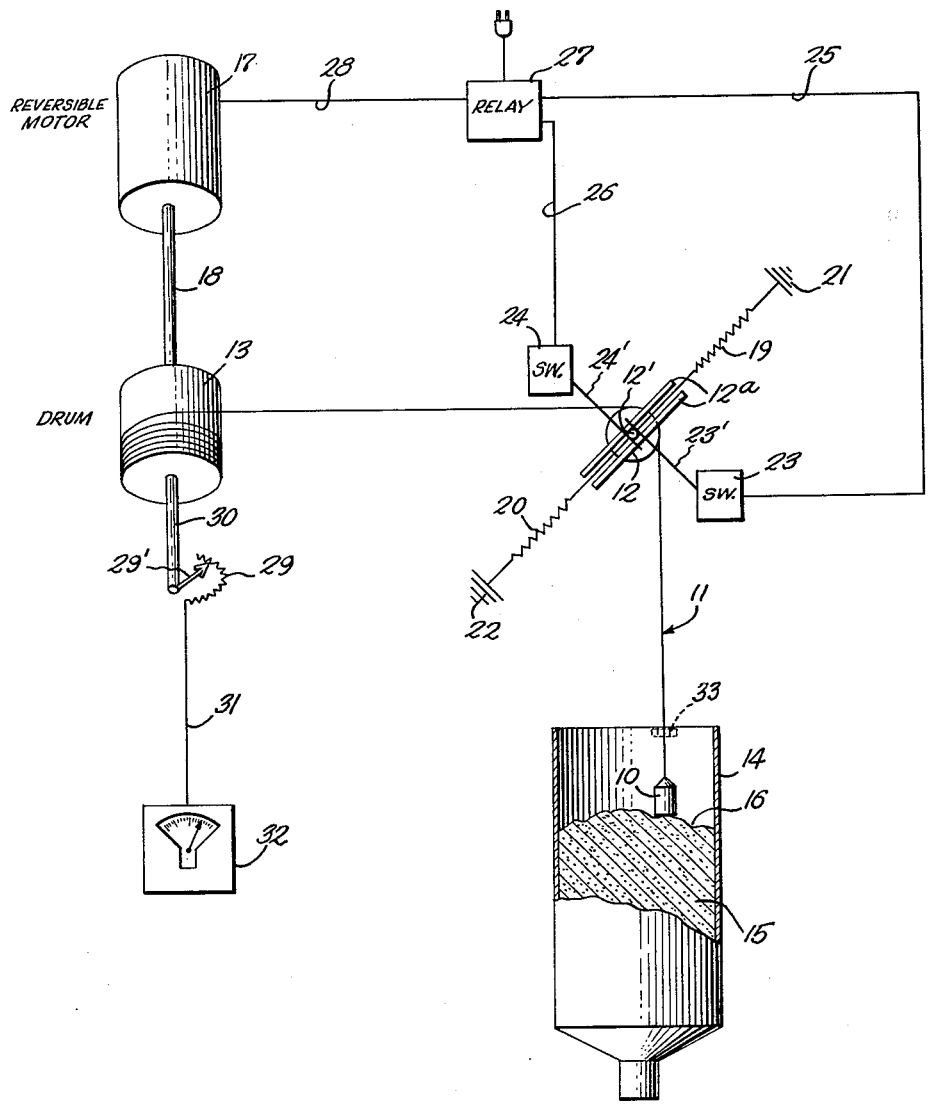
INVENTOR
*William E. Barker, Jr.*
BY
*Mason, Fenwick & Lawrence*
ATTORNEYS

United States Patent Office

3,099,158
Patented July 30, 1963

3,099,158
APPARATUS FOR MEASURING LEVELS OF
MATERIALS IN CONTAINERS
William E. Barker, Jr., Orlando, Fla., assignor to Poly
Tech Research, Inc., Orlando, Fla., a corporation of
Florida
Filed Jan. 2, 1962, Ser. No. 164,431
4 Claims. (Cl. 73—321)

The present invention relates in general to apparatus for measuring the level of materials in a container, and more particularly to apparatus for measuring the height of fill of materials stored in bins, elevators, hoppers or the like, wherein the drive and readout portions of the system may be located externally of the storage container remote from the measuring point.

An object of the present invention is the provision of novel apparatus for measuring the height of fill of materials stored in bins and the like, wherein a level sensing weight suspended from a cable and extending in the bin is positioned vertically to contact the surface of the stored material by a drive cable drum means located externally of the bin and means automatically responsive to variations in cable tension is provided to automatically change the direction of drive when the weight reaches the material surface.

Another object of the present invention is the provision of novel apparatus of the character described in the foregoing paragraph, wherein novel means are provided which respond to variations in the tension of the cable to drive a cable controlling drum in a direction to readjust the weight to contact the surface level of the stored material upon change in such surface level.

Another object of the present invention is the provision of apparatus of the character described in the foregoing paragraphs wherein indicator means responsive to cable drum rotation is provided to continuously produce a visible indication of the level of the weight in the bin.

Other objects, advantages and capabilities of the present invention will become apparent from the following detailed description, taken in conjunction with the accompanying drawing illustrating one preferred embodiment of the invention.

The FIGURE of the accompanying drawing is a diagrammatic illustration of apparatus for measuring the height of fill of materials stored in a bin embodying the present invention.

The present invention in general comprises a level sensing weight which is adapted to be lowered into contact with the surface level of material, particularly flowable solid material, in a storage container or bin, which is suspended from a cable trained over a spring supported pulley and fixed to and wound about a drum driven by a reversible motor. Switch contacts are disposed at fixed positions in the path of movement of a shaft or other projection from the spring supported pulley to respond to movement of the pulley when the cable tension decreases from a preselected value and when the cable tension increases to actuate a relay controlling the direction of drive of the reversible motor. In one preferred form, the switches are positioned to drive the drum in a direction to return the cable tension to a preselected value signifying light, but not full, contact of the weight with the material and thereby continuously maintain the weight substantially at the surface level of the stored material.

Referring to the figure of the drawing diagrammatically illustrating one practical embodiment of this invention, a level sensing weight indicated generally by the reference character 10 is suspended from a cable 11 which is trained about a pulley 12 and is anchored to and turned about the surface of a rotatable drum 13 for a plurality of turns. In this preferred embodiment, the cable 11 extends substantially horizontally from the rotatable drum 13 to the pulley 12 and depends vertically from the pulley 12 so that the pulley is subjected to the weight of the level sensing weight 10 and the portion of the cable 11 depending from the pulley 12. The level sensing weight 10 and depending portion of the cable 11 extend downwardly into a storage bin indicated at 14 containing, for example, a flowable solid material 15 whose surface level 16 is to be measured. The container 14 may be of the upwardly opening type, or may merely have an access opening in the top portion thereof for admission of the level sensing weight 10 and cable 11 to the interior thereof.

The rotatable drum 13 is journalled for rotation about its axis in any suitable manner and is driven by a reversible electric motor 17 of well known construction by means of any suitable drive connection indicated diagrammatically at 18.

The pulley 12 about which the cable 11 is trained is, in this preferred embodiment, resiliently supported for movement in response to variations in the tension of the cable 11 from a selected tension value, so that movement of the pulley 12 in response to changes in cable tension will regulate the reversible motor 17. This may be accomplished by slidably supporting the pulley shaft 12' in guide slots defined between pairs of guide rails or surfaces 12a inclined to the vertical axis of the depending cable portion, together with two oppositely extending springs 19 and 20 each connected at their remote ends to fixed supports indicated by the reference characters 21 and 22 and connected at their adjacent ends to the shaft 12' of the pulley 12 so that the pulley 12 will be normally resiliently positioned at a point between the two stationary supports 21, 22 determined by the relative rates of the springs 19, 20 and the tension on the cable 11 resulting from the level sensing weight 10 and the extent to which the weight 10 is supported by the stored material 15. A pair of stationary switches 23, 24 are positioned to dispose their switch operating arms 23', 24' closely adjacent to the pulley shaft 12' in the paths of movement of the pulley shaft 12' toward the stationary supports 21 and 22 so as to be actuated by movement of the pulley shaft 12' in either direction responsive to variations in the tension on the cable 11 from the selected tension value. The switches 23 and 24 are connected by leads 25 and 26 to reversing relays indicated at 27 for regulating the supply for the reversible motor 17 through connection 28 to drive the reversible motor 17 in a clockwise or counterclockwise direction depending upon the activation of switches 23 or 24 and to deenergize the motor 17 when neither of the switches 23 or 24 are closed. The motor 17 may, for example, be of the well known type having one field winding for driving the armature in a clockwise direction and another field winding for driving the armature in a counterclockwise direction, each energized independently by associated contacts of relays 27.

Data may be taken from the drum rotation to indicate the position of the level sensing weight 10 in the storage bin 14 by many different readout or indication systems, but in the preferred embodiment herein illustrated, the readout means comprises a multiturn potentiometer 29, the wiper arm 29' of which is connected to the drum 13 by any suitable mechanical connection diagrammatically indicated at 30 to continuously position the potentiometer wiper arm 29' in accordance with the angular position of the drum 13. The potentiometer winding may be connected by lead 31 to a conventional resistance meter 32 which is calibrated to indicate vertical levels in the storage bin 14 so that variations in the resistance of the potentiometer between the wiper arm 29' and one end of the resistance wire as determined by the angular position of the drum 13 and wiper arm 29′ will position the indicating arm of the meter 32 to indicate the surface level of material in the storage bin 14.

It will be apparent that the apparatus operates by raising and lowering the level sensing weight 10 on the cable 11 in the storage bin 14. As the level sensing weight 10 is lowered into contact with the stored material 15, the tension on the cable 11 decreases when the weight 10 contacts and is supported by the stored material, thus diminishing the force of the level sensing weight 10 and the adjacent cable portion opposing the action of the spring 19 and permitting the spring 19 to draw the pulley 12 and shaft 12′ toward the stationary support 21. The switch arm 23′ being interposed in this path of movement, is actuated by pulley shaft 12′ to close the switch 23 and condition the relay 27 to reverse the drive motor 17, which then drives the drum 13 in a reverse direction to raise the level sensing weight 10.

The apparatus may either be designed to cause the level sensing weight 10 to be moved back and forth between the surface level of the stored material and the top of the bin, or to cause the weight 10 to be automatically positioned in substantial registry with the surface level of the stored material. In the former case, the weight 10 will be returned to the top of the bin 14 upon reversal of the drive motor 17 responsive to contact of the weight 10 with the stored material surface, in which event the spring rates and switch positions will be chosen so that a greater amount of force will be required to actuate the switch arm 24′ than occurs when the weight 10 is freely suspended and a stop ring 33 or similar abutment, shown in broken lines in the figure, will be positioned adjacent the top of the bin 14 to engage the weight and exert a strong restraining force on the cable 11 which will displace the pulley 12 and shaft 12′ a sufficient distance to actuate the switch 24. This again reverses the direction of the motor 17 causing the drum 13 to be driven in a direction to lower the weight 10 toward the stored material surface. If the weight 10 is to be automatically positioned in substantial registry with the material surface, the spring rates and position of the switch arm 24′ will be chosen to cause the switch arm 24′ to be actuated by the pulley shaft 12′ responsive to a change in the tension on the cable 11 when the weight 10 has been raised a very slight distance adequate to remove the supporting effect of the material 15 on the weight 10. It will be understood that in this latter arrangement there would be a position of the pulley 12 and shaft 12′ at which neither the switch arm 23′ nor the arm 24′ would be actuated, which position would correspond to slight, but incomplete, support of the level sensing weight 10 by the stored material.

Thus, the apparatus, in its simplest form, may cause the weight to move up and down in the bin from the upper surface of the material 15 to the top of the bin 14, or the weight 10 may be moved up and down from a position of firm support by the material 15 to the lowest position of the weight wherein it is unsupported by the material. It will be apparent that the level of the surface of the material 15 in the storage bin 14 can be read from the meter 32 when the weight 10 is thus slightly supported by the upper surface of the stored material or when the drum reverses direction following lowering of the weight 10, thus providing a simple means for measuring the level of fill of the stored material.

This apparatus not only provides a simple and reliable construction for conveniently determining the level of fill of materials in a bin or similar storage container, but provides an arrangement which is particularly adaptable for installations where adverse conditions of temperature, humidity, abrasiveness or the like may be present in the bin, since only the level sensing weight 10 and the adjacent portions of the cable 11 are exposed to these adverse conditions. The drive and readout portions of the system can be located quite remote from the measuring point so that they may not be adversely affected by the conditions obtaining at the storage bin. It will be apparent that when flowable solid materials are used which have a tendency to "cone" within the storage bin, the position at which the level sensing weight 10 touches the material should be adjusted to take an average of the height of the stored material.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for determining the surface level of flowable material in a container comprising a level sensing weight member adapted to be brought into contact with said surface, a cable for suspending said weight member within said container for vertical movement relative to said surface, a rotatable drum on which said cable is wound and anchored, a reversible motor coupled to said drum for rotating said drum to draw in and pay out said cable for raising and lowering said weight member relative to said surface, a rotatable pulley over which the cable is trained overlying said container and supporting said weight member and a depending cable portion in suspended relation therefrom, means resiliently supporting said pulley for movement along an inclined axis responsive to variations in the tension of said cable produced by variations in the downward force exerted by said weight member, a pair of stationary switch members having switch arms disposed to be actuated by said pulley upon movement of the pulley along said axis responsive to increase and decrease of cable tension from a selected cable tension value, means responsive to actuation of said switch means for reversing the direction of drive of said reversible motor, and indicator means calibrated in container levels continuously responsive to the angular position of said drum to indicate the height of fill in said container.

2. Apparatus for determining the surface level of flowable material in a container comprising a level sensing weight member adapted to be brought into contact with said surface, a cable for suspending said weight member within said container for vertical movement relative to said surface, a rotatable drum on which said cable is wound and anchored, a reversible motor coupled to said drum for rotating said drum to draw in and pay out said cable for raising and lowering said weight member relative to said surface, a rotatable pulley over which the cable is trained overlying said container and supporting said weight member and a depending cable portion in suspended relation therefrom, guide means for said pulley restraining the pulley for movement along a rectilinear path inclined to a vertical axis, spring means connected to said pulley and extending in opposite directions therefrom along said path to stationary anchors resiliently supporting said pulley along said path at positions which vary in relation to variations in the tension exerted on the cable by said weight member, a pair of stationary switch members having switch arms disposed to be actuated by said pulley upon movement of the pulley along said path responsive to increase and decrease of cable tension from a selected cable tension value, means responsive to actuation of said switch means for reversing the direction of drive of said reversible motor, and indicator means calibrated in container levels continuously responsive to the angular position of said drum to indicate the height of fill in said container.

3. Apparatus as recited in claim 1 wherein said indicator means comprises a potentiometer having a wiper arm coupled to said drum to be continuously positioned in preselected relation to the angular position of said drum, and a resistance meter calibrated in container levels coupled to said potentiometer to measure the resistance thereof determined by the position of said wiper arm and thereby indicate the height of fill in said container.

4. Apparatus as recited in claim 2 wherein said indicator means comprises a potentiometer having a wiper arm coupled to said drum to be continuously positioned in preselected relation to the angular position of said drum, and a resistance meter calibrated in container levels coupled to said potentiometer to measure the resistance thereof determined by the position of said wiper arm and thereby indicate the height of fill in said container.

References Cited in the file of this patent
FOREIGN PATENTS 1,211,033   France _____ Mar. 11, 1960